(12) United States Patent
Ramesh et al.

(10) Patent No.: US 9,705,826 B2
(45) Date of Patent: Jul. 11, 2017

(54) L2 REDIRECTION IN MULTI-CHASSIS LAG ENVIRONMENTS

(71) Applicant: Avaya Inc., Basking Ridge, NJ (US)

(72) Inventors: Deepak Ramesh, Bangalore (IN); Ramachandra Hegde, Bangalore (IN); Vinay Gurusimha, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 94 days.

(21) Appl. No.: 14/501,306

(22) Filed: Sep. 30, 2014

(65) Prior Publication Data

US 2016/0094489 A1 Mar. 31, 2016

(51) Int. Cl.
*H04L 12/939* (2013.01)
*H04L 12/707* (2013.01)
*H04L 12/721* (2013.01)
*H04L 12/709* (2013.01)
*H04L 12/703* (2013.01)

(52) U.S. Cl.
CPC ............ *H04L 49/557* (2013.01); *H04L 45/22* (2013.01); *H04L 45/245* (2013.01); *H04L 45/28* (2013.01); *H04L 45/66* (2013.01); *Y02B 60/43* (2013.01)

(58) Field of Classification Search
CPC ............ H04L 41/0668; H04L 41/0663; H04L 45/245; H04L 45/28; H04L 45/00; H04L 45/66; H04L 12/46; H04L 41/12; H04L 12/4633; H04L 45/12; H04L 49/557; H04L 45/22; Y02B 60/33; Y02B 60/43; G06F 3/0635

USPC ....... 370/219, 392, 220, 390, 254, 475, 235, 370/422, 228; 709/217, 221, 224, 239, 709/220, 244
See application file for complete search history.

(56) References Cited

U.S. PATENT DOCUMENTS

| | | | |
|---|---|---|---|
| 6,556,541 B1 * | 4/2003 | Bare | H04L 12/185 370/235 |
| 7,719,958 B1 * | 5/2010 | Azimi | H04L 12/18 370/220 |
| 8,107,382 B2 * | 1/2012 | Lin | H04L 12/2697 370/244 |
| 2003/0097470 A1 * | 5/2003 | Lapuh | H04L 45/245 709/239 |
| 2005/0007951 A1 * | 1/2005 | Lapuh | H04L 45/00 370/225 |
| 2009/0010254 A1 * | 1/2009 | Shimada | H04L 45/245 370/389 |

(Continued)

*Primary Examiner* — Steven H Nguyen
*Assistant Examiner* — Ivan O LaTorre
(74) *Attorney, Agent, or Firm* — IP Spring (57) ABSTRACT

Methods, systems and computer readable media for L2 redirection in multi-chassis link access group (LAG) environments are described. In some implementations, the method can include determining, at a core switch, a failure of a link in a split multi-link trunk (SMLT), and building, at the core switch, a table mapping each destination media access control (MAC) address to an incoming split multi-link trunk port. The method can also include sending, from the core switch, a link layer discovery protocol (LLDP) redirect message on a per-destination MAC address and per-source access switch basis. The method can further include maintaining a same mapping for each MAC address not hashed to a cluster peer with the failed link or being mapped to a non-inter switch trunk (IST) port.

9 Claims, 5 Drawing Sheets (56) References Cited

U.S. PATENT DOCUMENTS

| | | | |
|---|---|---|---|
| 2011/0228767 A1* | 9/2011 | Singla | H04L 49/00 370/389 |
| 2012/0163162 A1* | 6/2012 | Zhang | H04L 49/552 370/218 |
| 2013/0077471 A1* | 3/2013 | Assarpour | H04L 41/0668 370/219 |
| 2013/0148547 A1* | 6/2013 | Page | H04L 67/12 370/255 |
| 2013/0243008 A1* | 9/2013 | Singla | H04L 49/00 370/422 |
| 2013/0315097 A1* | 11/2013 | Yang | H04L 41/0886 370/254 |
| 2014/0173127 A1* | 6/2014 | Samuels | H04L 41/082 709/234 |
| 2014/0173129 A1* | 6/2014 | Basso | H04L 12/5689 709/238 |
| 2014/0185461 A1* | 7/2014 | Gautreau | H04L 45/245 370/244 |
| 2014/0215027 A1* | 7/2014 | Janardhanan | H04L 41/0803 709/220 |
| 2014/0219081 A1* | 8/2014 | Natarajan | H04L 41/0659 370/228 |
| 2014/0241146 A1* | 8/2014 | Mahadevan | H04L 69/40 370/217 |
| 2014/0241147 A1* | 8/2014 | Rajagopalan | H04L 45/245 370/221 |
| 2014/0307553 A1* | 10/2014 | Fung | H04L 47/125 370/235 |
| 2015/0304218 A1* | 10/2015 | Wang | H04L 12/4641 370/254 |
| 2016/0020939 A1* | 1/2016 | Ramasubramanian | H04L 41/0654 370/217 |

* cited by examiner

L2 REDIRECTION IN MULTI-CHASSIS LAG ENVIRONMENTS

TECHNICAL FIELD

Embodiments relate generally to computer networks, and more particularly, to methods, systems and computer readable media for L2 redirection in multi-chassis link access group (LAG) environments or deployments.

BACKGROUND

In multi-chassis LAG environments packets can take suboptimal paths during a failover and for single homed switches. Embodiments were conceived in light of the above mentioned needs, problems and/or limitations, among other things.

SUMMARY

One or more embodiments can include methods, systems and computer readable media for L2 redirection in multi-chassis link access group (LAG) environments. In some implementations, the method can include determining, at a core switch, a failure of a link in a split multi-link trunk (SMLT), and building, at the core switch, a table mapping each destination media access control (MAC) address to an incoming split multi-link trunk port. The method can also include sending, from the core switch, a link layer discovery protocol (LLDP) redirect message on a per-destination MAC address and per-source access switch basis. The method can further include maintaining a same mapping for each MAC address not hashed to a cluster peer with the failed link or being mapped to a non-inter switch trunk (IST) port.

The method can also include receiving, at an access switch coupled to the core switch, an LLDP redirect message for a given destination MAC address, and redirecting the given destination MAC address to a sub-group of the split multi-link trunk and storing a redirection mapping in a table. The method can further include iteratively determining a different path for the given destination MAC address and updating a mapping for the given destination MAC address based on one or more subsequent LLDP redirect messages. The method can also include performing hierarchical hashing to maintain a mapping of unaffected MAC addresses to the split multi-link trunk and a mapping of affected MAC addresses to respective redirected paths. The method can further include load sharing unaffected MAC address communications across all available links of the split multi-link trunk.

The method can also include determining, at the core switch, that a status of the failed link has changed from an inoperative status indication to an operative status indication. The method can further include tracing, at the core switch, SMLT/MAC address combinations for LLDP redirect messages that were sent out, wherein the tracing is performed in response to detecting a bulk MAC address mapping change from IST to SMLT. The method can also include sending, from the core switch, an LLDP redirect heal message for each MAC address in the table to a corresponding SMLT/port.

The method can further include receiving, at the access switch, an LLDP redirect heal message for the given MAC address. The method can also include remapping, at the access switch, the given MAC address from a sub-group to the split multi-link trunk, and when a MAC address is not present in a mapping table of the access switch, ignoring the LLDP redirect heal message for that MAC address.

Some implementations can include a system comprising one or more processors configured to perform operations. Some implementations can include a nontransitory computer readable medium having stored thereon software instructions that, when executed by a processor, cause the processor to perform operations.

The operations for the system or nontransitory computer readable medium can include determining, at a core switch, a failure of a link in a split multi-link trunk (SMLT). The operations can also include building, at the core switch, a table mapping each destination media access control (MAC) address to an incoming split multi-link trunk port. The operations can further include sending, from the core switch, a link layer discovery protocol (LLDP) redirect message on a per-destination MAC address and per-source access switch basis. The operations can also include maintaining a same mapping for each MAC address not hashed to a cluster peer with the failed link or being mapped to a non-inter switch trunk (IST) port.

The operations can further include receiving, at an access switch coupled to the core switch, an LLDP redirect message for a given destination MAC address, and redirecting the given destination MAC address to a sub-group of the split multi-link trunk and storing a redirection mapping in a table. The operations can also include iteratively determining a different path for the given destination MAC address and updating a mapping for the given destination MAC address based on one or more subsequent LLDP redirect messages. The operations can further include performing hierarchical hashing to maintain a mapping of unaffected MAC addresses to the split multi-link trunk and a mapping of affected MAC addresses to respective redirected paths, and load sharing unaffected MAC address communications across all available links of the split multi-link trunk.

The operations can also include determining, at the core switch, that a status of the failed link has changed from an inoperative status indication to an operative status indication. The operations can further include tracing, at the core switch, SMLT/MAC address combinations for LLDP redirect messages that were sent out, wherein the tracing is performed in response to detecting a bulk MAC address mapping change from IST to SMLT. The operations can also include sending, from the core switch, an LLDP redirect heal message for each MAC address in the table to a corresponding SMLT/port.

The operations can further include receiving, at the access switch, an LLDP redirect heal message for the given MAC address, and remapping, at the access switch, the given MAC address from a sub-group to the split multi-link trunk. The operations can also include when a MAC address is not present in a mapping table of the access switch, ignoring the LLDP redirect heal message for that MAC address.

DETAILED DESCRIPTION

Figure 1:
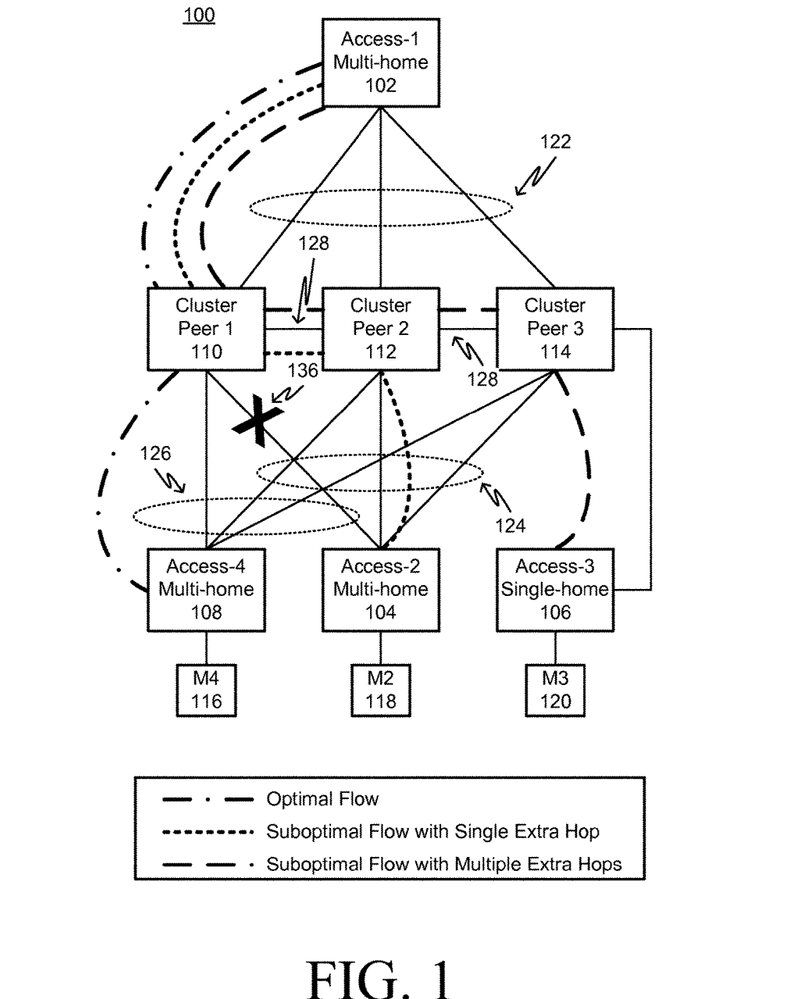
FIG. 1 is a diagram of an example network environment in which a link failure has occurred in accordance with at least one implementation.

FIG. 1 is a diagram of an example network environment 100, which includes a plurality of access switches (102-108), a plurality of cluster peer core switches (110-114), a plurality of MAC addresses (116-120) corresponding to devices connected to the network, a first SMLT 122, a second SMLT 124, a third SMLT 126, and inter switch trunks 128 connecting the cluster peers (110-114).

In this example, a link failure has occurred at link 136 between Cluster Peer 1 110 and Access 2 104. FIG. 1 illustrates a problem that can arise with conventional networks in that during a link failure in a multi-chassis LAG network, suboptimal paths may be used. For example, the path from Access Switch 1 102 to Access Switch 2 104 passes through Cluster Peer 1 110 and then, via IST, to Cluster Peer 2 112 and then on to Access Switch 2 104. This path includes an extra hop (e.g., the hop to Cluster Peer 1 110). In another example of a suboptimal path, the path from Access Switch 1 102 to Access Switch 3 106 includes hops to Cluster Peer 1 110, then via IST to Cluster Peer 2 112 and then via IST to Cluster Peer 3 114 and on to Access Switch 3.

In the example failover situation shown in FIG. 1, an example L2 MAC table for Access Switch 1 102 may look like the following:

| MAC Addr. | Interface |
| --- | --- |
| M2 | MLT-11 (e.g., 122 in FIG. 1) |
| M3 | MLT-11 |
| M4 | MLT-11 |

In some systems having a routed network (e.g., based on IP address), L3 redirection may be used during a link failover situation. L3 redirection may be complicated due to a need to perform redirection on a per subnet basis and there may be many subnets in a network. An implementation of the L2 redirection disclosed herein can provide for redirection on a per link basis, which can eliminate a need for redirection at the L3 layer (e.g., on a per subnet basis). Accordingly, all nets and subnets at the L3 layer receive the advantage of redirection via an optimal (or near optimal) path with the reduced complexity and overhead provided by redirection on a per link basis.

Details of the L2 redirection processes including detecting a suboptimal path and a recovery scenario are described below in connection with FIGS. 3A-B and 4A-B.

Figure 3A:
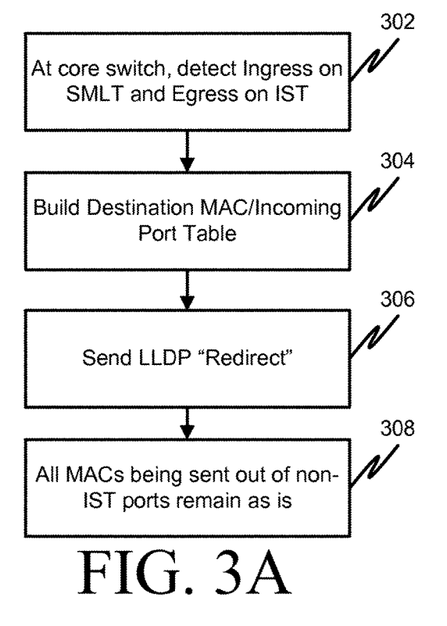
FIGS. 3A and 3B are flow charts of an example method for L2 redirection in accordance with at least one implementation.
Figure 3B:
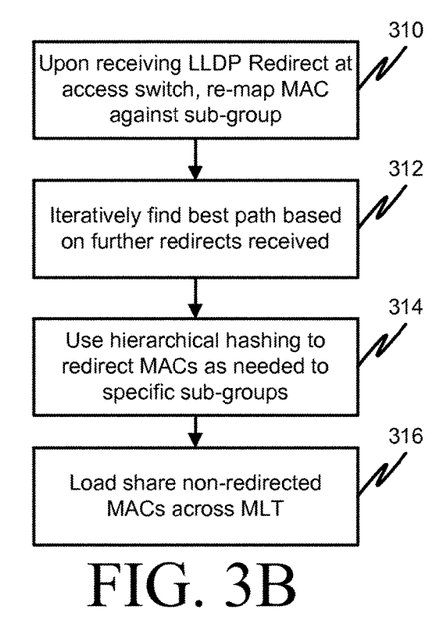

FIGS. 3A and 3B are flow charts of an example method for L2 redirection in accordance with at least one implementation. FIG. 3A is directed to a method for a core switch and FIG. 3B is directed to a method for an access switch. Processing begins at 302, where at a core switch level (e.g., 110-114), a core switch (e.g., Cluster Peer 1 110) determines a message with a destination of MAC M2 118 ingressing on an operative (i.e., "up") SMLT port and determines the egress port is IST (e.g., 128), then uses a filter rule to copy to the Cluster Peer 1 110 for all. Processing continues to 304.

At 304, the core switch (e.g., 110) can build a table of destination MAC (e.g., M2) and incoming port (e.g., SMLT port) and can trigger an LLDP "redirect" message out of that ingress SMLT port destined to the source access switch MAC address. Processing continues to 306.

At 306, the LLDP redirect message is sent on a per-destination MAC and per-source access switch basis. Processing continues to 308.

At 308, All MAC addresses not being sent to the core switch having a failed link (e.g., Cluster Peer 1 110 in FIG. 1) or being sent out of non-IST ports (e.g., the message path between Access-1 and M4) continue to remain as they were.

Figure 2:
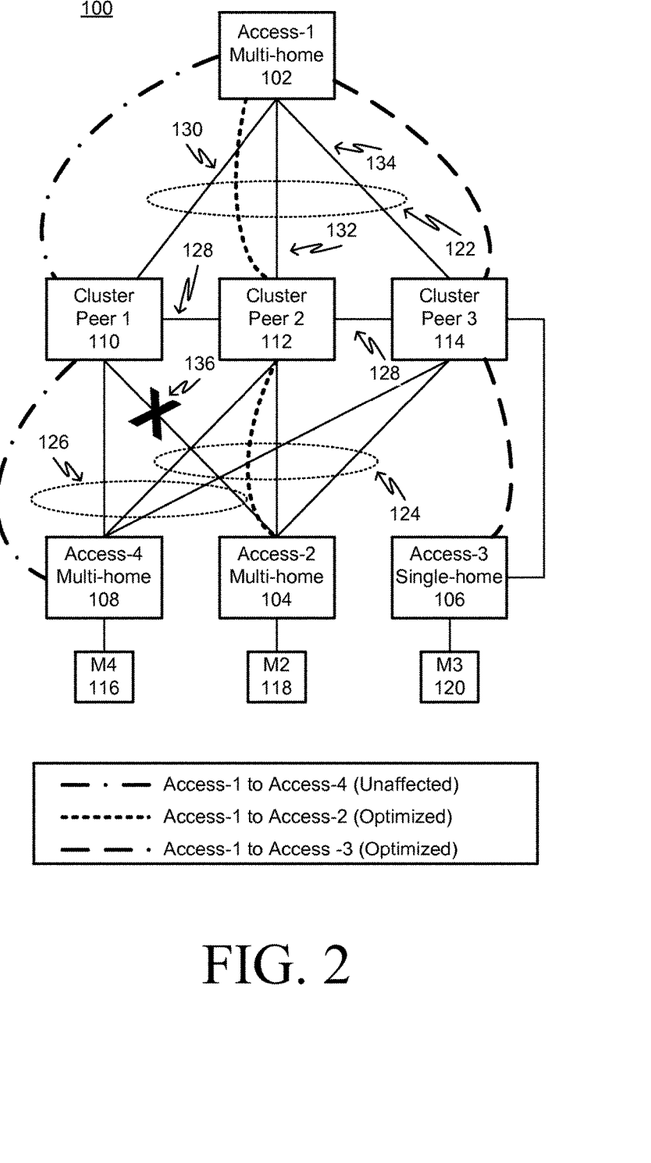
FIG. 2 is a diagram of an example network environment showing L2 redirection in response to the link failure in accordance with at least one implementation.

For the access switch, processing begins at 310, where upon receiving an LLDP redirect message for a given MAC address, the cluster peer instructs re-mapping to a sub-group within the split multi-link trunk. For example, Access Switch 1 receives an LLDP message instructing a re-mapping of a MAC (e.g., M2) on G1 (shown in FIG. 2 as 130) against G2 or G3 (M2 had previously been mapped to MLT-11 as discussed above). Processing continues to 312.

At 312, the access switch iteratively finds the best (e.g., optimal or near-optimal) path based on any further redirects received (e.g., move from MLT-11 to G2 or G3 in the case of M3). Processing continues to 314.

At 314, hierarchical hashing is used to permit unaffected MACs to still hash to the SMLT (e.g., MLT-11 122), while redirected MACs hash against specific sub-groups (E.g., G1 130, G2 132 or G3 134). Processing continues to 316.

At 316, all non redirected MACs continue to get load-shared across all links of MLT-11 122 and mapped against MLT-11 122.

In the example redirection situation shown in FIG. 1 and after the process described above in connection with FIGS. 3A and 3B, an example L2 MAC table for Access Switch 1 102 may look like the following:

| MAC Addr. | Interface |
| --- | --- |
| M2 | G2 (132 in FIG. 2) |
| M3 | G3 (134 in FIG. 2) |
| M4 | MLT-11 (122 in FIG. 2) |

Figure 4A:
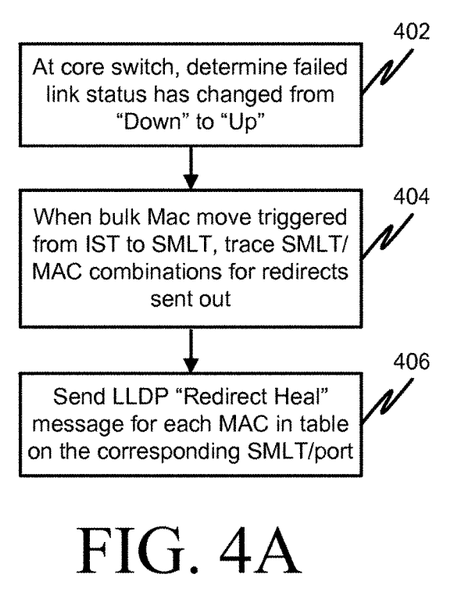
FIGS. 4A and 4B are flow charts of an example method for link failure recovery in accordance with at least one implementation.

FIGS. 4A and 4B are flow charts of an example method for link failure recovery in accordance with at least one implementation. Processing begins at 402, where a core switch (e.g., 110-114) determines that a status indication of a failed SMLT link (e.g., 130 in FIG. 1) has changed from inoperative (i.e., "down") to operative (i.e., "up"). Processing continues to 404.

At 404, when a bulk MAC move is triggered from IST to SMLT and detected by the core switch, the core switch compares MACs against the redirect MAC table to trace out SMLT (port)/MAC combinations for all redirect messages sent. Processing continues to 406.

At 406, the core switch instructs new LLDP "redirect heal" messages to be sent out for each individual MAC in the table on the corresponding SMLT/port.

Figure 4B:
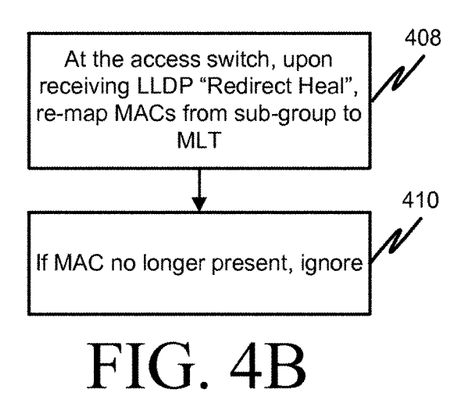

Processing for the access switch begins at 408, where when the access switch receives the LLDP "redirect heal" message, the access switch re-maps individual MACs to MLT-11 122 from one of the sub-groups G1 130, G2 132 or G3 134. Processing continues to 410.

At 410, if a MAC address isn't present in the table, the access switch can simply ignore the "redirect heal" message for that MAC.

It will be appreciated that 302-316 and 402-410 can be repeated in whole or in part in order to accomplish an L2 redirection task.

Figure 5:
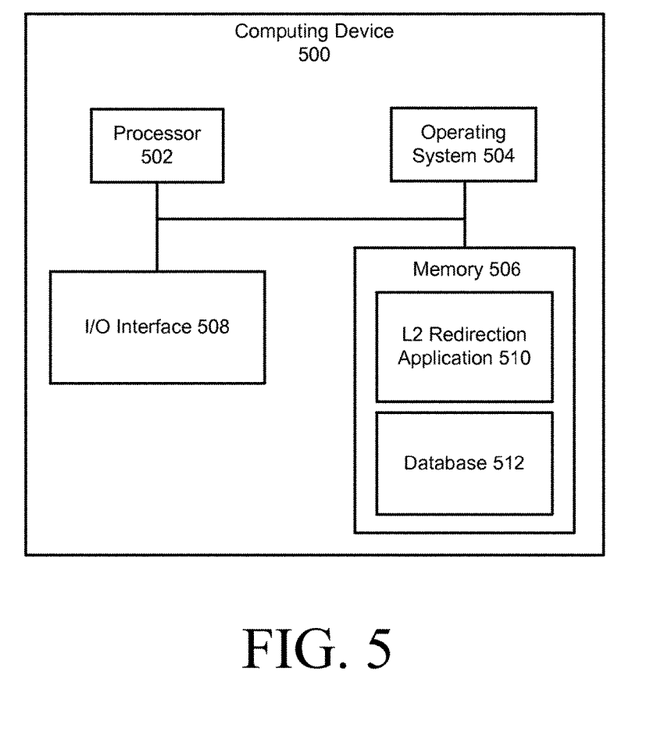
FIG. 5 is a diagram of an example computer system for L2 redirection in accordance with at least one implementation.

FIG. 5 is a diagram of an example computer system 500 (e.g., a computer system in an access switch, a core switch or the like) in accordance with at least one implementation. The computer 500 includes a processor 502, operating system 504, memory 506 and I/O interface 508. The memory 506 can include an L2 redirection application 510 and a database 512 (e.g., for storing MAC address redirection tables or the like).

In operation, the processor 502 may execute the application 510 stored in the memory 506. The application 510 can include software instructions that, when executed by the processor, cause the processor to perform operations for L2 redirection in accordance with the present disclosure (e.g., performing one or more of steps 302-316 and/or 402-410).

The application program 510 can operate in conjunction with the database 512 and the operating system 504.

Implementations of the L2 methods and systems described herein may be independent of any proprietary solution and thus can provide an advantage of being usable for any multi-chassis solution. It will also be appreciated that an implementation of the L2 redirection described herein can be configured for use with single-homed access switches.

Also, it will be appreciated that an implementation provides for redirection of only those MAC addresses taking a suboptimal path over an IST link. The paths of other, non-affected MAC addresses remain the same. Further, redirection in an implementation takes place only when alternative optimal paths are available based on SMLT operational status.

By providing for redirection on a per-source node/destination MAC address basis, an implementation can help ensure scalability. Through the use of LLDP, an implementation can provide an advantage of dynamic discovery of sub-groups. By including hierarchical hashing within a trunk group, an implementation can provide an advantage of ensuring that all links are available for load balancing when no outage is present.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for L2 redirection in multi-chassis link access group (LAG) environments.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   determining, at a core switch, a failed link in a split multi-link trunk (SMLT), wherein the failed link is determined based on detecting a message ingressing to the core switch on an operative SMLT port and egressing on an inter switch trunk (IST) port;
   building, at the core switch, a table mapping each destination media access control (MAC) address to an incoming split multi-link trunk port;
   sending, from the core switch, a link layer discovery protocol (LLDP) redirect message on a per-destination MAC address and per-source access switch basis;
   maintaining a same mapping for each MAC address not hashed to a cluster peer with the failed link or being mapped to a non-inter switch trunk (IST) port;
   determining, at the core switch, that a status of the failed link has changed from an inoperative status indication to an operative status indication;
   tracing, at the core switch, SMLT/MAC address combinations for LLDP redirect messages that were sent out, wherein the tracing is performed in response to detecting a bulk MAC address mapping change from IST to SMLT; and
   sending, from the core switch, an LLDP redirect heal message for each MAC address in the table to a corresponding SMLT/port.

2. The method of claim 1, further comprising:
   receiving, at an access switch coupled to the core switch, an LLDP redirect message for a given destination MAC address;
   redirecting the given destination MAC address to a sub-group of the split multi-link trunk and storing a redirection mapping in a table;
   iteratively determining a different path for the given destination MAC address and updating a mapping for the given destination MAC address based on one or more subsequent LLDP redirect messages;
   performing hierarchical hashing to maintain a mapping of unaffected MAC addresses to the split multi-link trunk and a mapping of affected MAC addresses to respective redirected paths; and
   load sharing unaffected MAC address communications across all available links of the split multi-link trunk.

3. The method of claim 1, further comprising:
   receiving, at the access switch, an LLDP redirect heal message for the given MAC address;
   remapping, at the access switch, the given MAC address from a sub-group to the split multi-link trunk; and
   when a MAC address is not present in a mapping table of the access switch, ignoring the LLDP redirect heal message for that MAC address.

4. A system comprising one or more processors configured to perform operations including:
   determining, at a core switch, a failed link in a split multi-link trunk (SMLT), where the failed link is determined based on detecting a message ingressing to the core switch on an operative SMLT port and egressing on an inter switch trunk (IST) port;
   building, at the core switch, a table mapping each destination media access control (MAC) address to an incoming split multi-link trunk port;
   sending, from the core switch, a link layer discovery protocol (LLDP) redirect message on a per-destination MAC address and per-source access switch basis;
   maintaining a same mapping for each MAC address not hashed to a cluster peer with the failed link or being mapped to a non-inter switch trunk (IST) port;
   determining, at the core switch, that a status of the failed link has changed from an inoperative status indication to an operative status indication;
   tracing, at the core switch, SMLT/MAC address combinations for LLDP redirect messages that were sent out, wherein the tracing is performed in response to detecting a bulk MAC address mapping change from IST to SMLT; and
   sending, from the core switch, an LLDP redirect heal message for each MAC address in the table to a corresponding SMLT/port.

5. The system of claim 4, wherein the operations further comprise:
   receiving, at an access switch coupled to the core switch, an LLDP redirect message for a given destination MAC address;
   redirecting the given destination MAC address to a sub-group of the split multi-link trunk and storing a redirection mapping in a table;
   iteratively determining a different path for the given destination MAC address and updating a mapping for the given destination MAC address based on one or more subsequent LLDP redirect messages;
   performing hierarchical hashing to maintain a mapping of unaffected MAC addresses to the split multi-link trunk and a mapping of affected MAC addresses to respective redirected paths; and
   load sharing unaffected MAC address communications across all available links of the split multi-link trunk.

6. The system of claim 4, further comprising:
   receiving, at the access switch, an LLDP redirect heal message for the given MAC address;
   remapping, at the access switch, the given MAC address from a sub-group to the split multi-link trunk; and
   when a MAC address is not present in a mapping table of the access switch, ignoring the LLDP redirect heal message for that MAC address.

7. A nontransitory computer readable medium having stored thereon software instructions that, when executed by a processor, cause the processor to perform operations including:
   determining, at a core switch, a failed link in a split multi-link trunk (SMLT), where the failed link is determined based on detecting a message ingressing to the core switch on an operative SMLT port and egressing on an inter switch trunk (IST) port;
   building, at the core switch, a table mapping each destination media access control (MAC) address to an incoming split multi-link trunk port;
   sending, from the core switch, a link layer discovery protocol (LLDP) redirect message on a per-destination MAC address and per-source access switch basis;
   maintaining a same mapping for each MAC address not hashed to a cluster peer with the failed link or being mapped to a non-inter switch trunk (IST) port;
   determining, at the core switch, that a status of the failed link has changed from an inoperative status indication to an operative status indication;

tracing, at the core switch, SMLT/MAC address combinations for LLDP redirect messages that were sent out, wherein the tracing is performed in response to detecting a bulk MAC address mapping change from IST to SMLT; and sending, from the core switch, an LLDP redirect heal message for each MAC address in the table to a corresponding SMLT/port.

8. The nontransitory computer readable medium of claim 7, wherein the operations further comprise:

receiving, at an access switch coupled to the core switch, an LLDP redirect message for a given destination MAC address;

redirecting the given destination MAC address to a sub-group of the split multi-link trunk and storing a redirection mapping in a table;

iteratively determining a different path for the given destination MAC address and updating a mapping for the given destination MAC address based on one or more subsequent LLDP redirect messages;

performing hierarchical hashing to maintain a mapping of unaffected MAC addresses to the split multi-link trunk and a mapping of affected MAC addresses to respective redirected paths; and load sharing unaffected MAC address communications across all available links of the split multi-link trunk.

9. The nontransitory computer readable medium of claim 7, further comprising:

receiving, at the access switch, an LLDP redirect heal message for the given MAC address;

remapping, at the access switch, the given MAC address from a sub-group to the split multi-link trunk; and when a MAC address is not present in a mapping table of the access switch, ignoring the LLDP redirect heal message for that MAC address.

* * * * *